United States Patent Office 3,141,044
Patented July 14, 1964

3,141,044
A-NORPREGNA-3,6-DIENE-2,20-DIONE
Frank Lee Weisenborn, Somerset, N.J., assignor to Olin Mathieson Chemical Corporation, New York, N.Y., a corporation of Virginia
No Drawing. Filed Nov. 19, 1962, Ser. No. 238,768
1 Claim. (Cl. 260—586)

This invention relates to the new compound A-norpregna-3,6-diene-2,20-dione.

A-norpregna-3,6-diene-2,20-dione is produced by dehydrating 7α-hydroxy-A-norprogesterone. The dehydration is effected in the presence of a mild dehydration agent such as alkali metal alkoxides, e.g., potassium t-butoxide, Group III metal alkoxides, e.g., aluminum t-butoxide, aluminum isopropoxide and the like, in an inert organic solvent such as alcohols, e.g., t-butyl alcohol, hydrocarbons, e.g., benzene, toluene and the like. The reaction may be carried out at a temperature from room temperature to the reflux temperature of the solvent and in an inert atmosphere, e.g., under nitrogen.

The product is separated from the reaction mixture by conventional means such as solvent extraction, distribution between selective solvents, chromatography or the like.

A-norpregna-3,6-diene-2,20-dione is useful as an androgen antagonist, e.g., to inhibit the development of male characteristics caused by the presence of an excess amount of an androgen such as testosterone. The composition may be administered orally or parenterally in conventional dosage forms such as tablets, capsules, injectables or the like.

The following example is illustrative of the invention:

*Example*

7α-hydroxy-A-norprogesterone (100 mg.) is dissolved in 25 ml. of t-butyl alcohol containing 100 mg. of potassium t-butoxide and the mixture is heated under reflux in a nitrogen atmosphere for two hours. The solution is neutralized with acetic acid, evaporated to dryness in vacuo, and the residue distributed between chloroform and water. The chloroform layer is dried over magnesium sulfate and concentrated to dryness leaving 91 mg. of crude product. This residue is chromatographed on Merck's acid-washed alumina and the A-norpregna-3,6-diene-2,20-dione is eluted with 50% ether-benzene. Recrystallization from acetone-hexane gives 45 mg. of pure product, M.P. 153–154° C.; $[\alpha]_D$ +89.5° (chloroform);

$$\lambda_{max.}^{EtOH} \ 277 \ m\mu \ (\epsilon = 22,100)$$

*Analysis.*—Calcd. for $C_{20}H_{26}O_2$: C, 80.49; H, 8.78. Found: C, 80.39; H, 8.73.

What is claimed is:
A-norpregna-3,6-diene-2,20-dione.

References Cited in the file of this patent
UNITED STATES PATENTS 2,739,974    Colton _____ Mar. 27, 1956
2,972,623    Johns _____ Feb. 21, 1961